United States Patent [19]

Osawa et al.

[11] Patent Number: 5,119,439
[45] Date of Patent: Jun. 2, 1992

[54] METHOD OF AND APPARATUS FOR EXTRACTING IMAGE CONTOUR DATA

[75] Inventors: Ikuo Osawa; Haruo Nakagawa; Hirofumi Kohno, all of Kyoto, Japan

[73] Assignee: Dainippon Screen Mfg. Co., Ltd., Kyoto, Japan

[21] Appl. No.: 645,910

[22] Filed: Jan. 25, 1991

[30] Foreign Application Priority Data

Feb. 6, 1990 [JP] Japan .................................. 2-26428

[51] Int. Cl.$^5$ ............................................ G06K 9/48
[52] U.S. Cl. ...................................... 382/22; 382/27; 382/44
[58] Field of Search ............................. 382/22, 60, 44; 356/376, 377

[56] References Cited

U.S. PATENT DOCUMENTS 4,272,756  6/1981  Kakumoto et al. .................. 382/44
4,428,077  1/1984  Shinada et al. ....................... 382/44

Primary Examiner—Leo H. Boudreau
Assistant Examiner—Barry Stellrecht
Attorney, Agent, or Firm—Lowe, Price, LeBlanc & Becker

[57] ABSTRACT

A partial image section is set as including part of a contour line of a particular image area in an original image appearing on a display screen. An image in the partial image section is binarized by referring to a selected threshold level. A boundary of the resulting binary image is detected for extraction of contour data in the partial image section. A plurality of such partial image sections are set successively in a way to partly overlap each other. Contour data (N2,M2) in an overlapping region of two adjacent partial image sections (Ni,Ni-1) are extracted by obtaining a plurality of dividing points ($m_0,n_0,m_1,n_1$, etc.) dividing, in corresponding proportions, two partial extracted contour lines lying in the overlapping region of adjacent partial image sections, distributing segments linking corresponding dividing points on the two parallel extracted contour lines in ratios corresponding to an order of arrangement of the dividing points, and deriving contour data for the overlapping region from coordinates of these distributing points ($i_1, i_2$, etc).

16 Claims, 12 Drawing Sheets

METHOD OF AND APPARATUS FOR EXTRACTING IMAGE CONTOUR DATA

BACKGROUND OF THE INVENTION

(1) Field of the Invention

The present invention relates to a method of and apparatus for extracting contour data of a particular image area in an original image such as a photographic image, which is used in preparing a "silhouette mask" in a photo process.

(2) Description of the Related Art

In printing a commodity pamphlet or the like, a photograph of a commodity used as an original usually includes the background as well as the commodity. It often is the case that a finished print shows only a commodity image after eliminating the background. The silhouette mask is used for such a purpose, and is prepared through electronic image processing as set out hereunder.

First, vector data or binary data of a contour line of a particular image area in an original are prepared. Then, silhouette mask pattern data are prepared by assigning "1" to one of the areas inside and outside the contour line and "0" to the other. On the basis of the silhouette mask pattern data, the particular image area alone is extracted from the original for reproduction.

In preparing silhouette mask pattern data as noted above, contour data of a particular image area in an original are obtained by a method as disclosed in UK Patent GB 2 121 534B or U.S. Pat. No. 4,868,884. These conventional methods will be described hereinafter with reference to FIG. 1.

In FIG. 1, area A is a particular image area to be extracted, and area B a background area. A partial image section N1 represented in a frame is set to a selected location including part of a contour line l which is a border in density variation of the image area A. Density levels of pixels within this image section N1 are compared with a predetermined threshold level to binarize image data of the image section N1. Coordinates of the borderline are obtained by tracing the border of the binary image. The coordinates of the borderline constitute contour data of a partial image in the image section N1.

Once the contour data of the partial image section N1 are obtained, the operator moves the partial image section slightly along the contour line l of the image area A and sets a new partial image section N2. Contour data of a partial image in the image section N2 are obtained through the same process as described above.

This process is carried out successively for partial image sections N1, N2, N3 and so on which are set along the contour line l of the particular image area A, thereby to obtain contour data of the contour line l of the image area A.

The manner of setting the threshold level is different between the methods described in UK Patent GB 2 121 534B and U.S. Pat. No. 4,868,884. In the former, an average density value of each partial image section is automatically set as a threshold level. According to this method, however, a difference may occur in threshold level between adjacent image sections when extracting a natural image, for example, which involves gradually varying average density levels. This results in an inconvenience, as shown in FIG. 2, of extracting broken contour lines Li and Li+1 from adjacent partial image sections Ni and Ni+1.

In the latter method, the operator may freely select a threshold level by manipulating an encoder (which is called a shaft in the published application). According to this method, the operator, while watching extracted contour lines in the respective partial image sections appearing on a screen, selects threshold levels to obtain a continuous contour line running through adjacent partial image sections. Thus, this method presents a prima facie solution to the problem mentioned above.

It is to be noted that, in this specification, the term "contour line" refers to the contour of the particular image area A which is recognized as a border in density variations of an image in an original, while the term "extracted contour line" refers to a line based on contour data of the particular image area A and extracted through image processing. The two lines are differentiated herein.

The latter method described above also has a disadvantage.

That is, the extracted contour line may be broken in the following case. Assume a case as shown in FIG. 3A, for example, where a contour line l of particular image areas A1 and A2 having a wide difference in density level is to be extracted in a direction shown in a dot-and-dash line. It is also assumed that the particular image areas A1 and A2 and a background area B have density variations transversely of the contour line l, i.e. in the direction of its width w in FIG. 3A. As depicted in enlargement in FIG. 3B, a new partial image section Ni is set following an image section Ni−1. A threshold level is set so that an extracted contour line Li' in the current image section Ni continue from an extracted contour line Li−1 in the preceding image section Ni−1. Then, the contour line may not be extracted for the image area A2 though extracted for the image area A1. If a threshold level is set for extracting the contour line of the image area A2, an extracted contour line Li' will be staggered from the extracted contour line Li−1 in the previous image section Ni−1 as shown in FIG. 3C. This inconvenience may be avoided by reducing the size and amount of movement of the partial image section, and adjusting the threshold level with nicety. However, such an operation is irksome and inefficient.

As described above, the technical problem of obtaining a continuous extracted contour line is by and large solved by allowing a threshold level to be set for each partial image section. However, there remains a drawback that the extracted contour line is broken when use is made of partial image sections having a normal size suited for operation.

When an extracted contour line is broken, a data correcting process is carried out as described in the UK Patent GB 2 121 534B. That is, after collecting all contour data, a straight line is drawn to interconnect detected coordinate points defining the shortest distance between extracted, broken contour lines. Alternatively, a manual correction is effected in which the operator monitors extracted contour lines appearing on a screen and interconnects the lines at positions of discontinuity.

According to the correction based on the simple data processing noted above, the extracted contour line becomes jagged and unsightly. The manual correction has the disadvantage of requiring time and trouble and lowering operating efficiency.

SUMMARY OF THE INVENTION

The present invention has been made having regard to the state of the art noted above. Its main object is to provide a method and apparatus for preparing image contour data, which allow faithful extraction of a contour line of a particular image area in an original, and realize an extracted contour line continuous through adjacent partial image sections.

The above object is fulfilled, according to the present invention, by a method of extracting contour data of a particular image area in an original image, which comprises the following steps:

(a) setting a plurality of partial image sections including part of a contour line of the particular image area in the original image, the partial image sections being set successively in a way to partly overlap each other along the contour line;

(b) binarizing an image in each of the partial image sections by comparing density of each pixel in each of the partial image sections with a selected threshold level;

(c) preparing contour data of each of the partial image sections by detecting a boundary of the binary image, the contour data representing partial extracted contour lines in the partial image sections;

(d) obtaining a plurality of dividing points dividing, in corresponding proportions, two partial extracted contour lines lying in an overlapping region of adjacent partial image sections;

(e) distributing segments linking corresponding dividing points on the two partial extracted contour lines in ratios corresponding to an order of arrangement of the dividing points; and (f) deriving contour data for the overlapping region from coordinates of each distributing point.

Specifically, the step (c) includes the steps of:

detecting a tracing direction for tracing the contour line;

detecting a starting point for tracing the contour line; and obtaining the contour data of each of the partial image sections by tracing the contour line in the tracing direction from the starting point.

The tracing direction is detected, for example, by reference to a cursor lying in one of inside and outside positions with respect to each of the partial image sections, the cursor appearing on a display screen for indicating a position of each of the partial image sections. More particularly, the tracing direction is detected by reading a binary data of a pixel corresponding to the position to which the cursor is set, and detecting the tracing direction by determining whether the binary data is "0" or "1".

The step of detecting the starting point includes the steps of:

reading binary data of adjacent pixels in a fixed direction in a spiral form around the pixel corresponding to the position to which the cursor is set; and selecting a current data-read pixel or a previous data-read pixel to be the starting point depending on the tracing direction when a variation of the binary data takes place.

The step of obtaining the contour data of each of the partial image sections by tracing the contour line in the tracing direction from the starting point includes the steps of:

reading the binary data of adjacent pixels successively clockwise or counterclockwise depending on the tracing direction, with the starting point acting as a center of contour data search, from a search starting point provided by a pixel before a pixel at which the variation of the binary data has taken place;

recording, as contour data, coordinates of the pixel at which the variation of the binary data has taken place, the pixel being regarded as a contour pixel; and detecting a new contour pixel by reading the binary data of adjacent pixels successively clockwise or counterclockwise depending on the tracing direction, with the contour pixel acting as a center of next contour data search, from a search starting point provided by the pixel previously acting as the center of search.

Further, the foregoing step (d) includes the steps of:

obtaining length of a first extracted contour line from a starting point in a current partial image section to an exit of the overlapping region of adjacent partial image sections by counting pixels;

obtaining coordinates of a first row of dividing points dividing the first extracted contour line into equal length parts;

obtaining length of a second extracted contour line from a first point where contour data of a previous partial image section cross the current partial image section to the exit of the overlapping region of adjacent partial image sections by counting pixels; and obtaining coordinates of a second row of dividing points dividing the second extracted contour line into equal length parts correspondingly to the first extracted contour line.

The step (e) proportionally distributes respective straight lines linking the first row of dividing points (nj) and the second row of dividing points (mj) in a ratio of j:(Q−j) where Q is the number of divisions of each of the extracted contour lines and j is natural numbers from 0 to Q.

The method according to the present invention may include, in addition to the steps (a) through (f), the step (g) of carrying out a process, as at steps (d) through (f), of preparing the contour data in the overlapping region of adjacent partial image sections each time a new partial image section is set, to successively display extracted contour lines based on contour data thereby obtained.

Specifically, the step (g) includes the step of selecting adjacent pixels in a predetermined direction around a pixel forming a first crossing point between contour data of a previous partial image section and a frame of a current partial image section, detecting a pixel at which binary data thereof show a change, and setting the pixel as a starting point for tracing the contour line in the current partial image section.

An apparatus for extracting contour data of a particular image area in an original image, according to the present invention, comprises:

(a) an original image data memory for storing image data of the original image;

(b) a display for reading and displaying contents of the original image memory;

(c) a device for setting partial image sections including part of a contour line of the particular image area in the original image shown by the display, the partial image sections being set successively in a way to partly overlap each other along the contour line;

(d) a partial original image data memory for storing original image data in the partial image sections read from the original image data memory device;

(e) a binarizing device for binarizing an image in each of the partial image sections by comparing density of each pixel stored in the partial original image data memory with a selected threshold level;

(f) a binary data memory for storing binary data of the partial image sections;

(g) a contour data extracting device for extracting contour data of each of the partial image sections by reading contents of the binary data memory and detecting a boundary of the binary image;

(h) a contour data memory for storing the extracted contour data;

(i) a dividing point calculating device for obtaining a plurality of dividing points dividing, in corresponding proportions, two partial extracted contour lines lying in an overlapping region of adjacent partial image sections;

(j) a distributing device for distributing segments linking corresponding dividing points on the two partial extracted contour lines in ratios corresponding to an order of arrangement of the dividing points; and (k) a device for recording coordinates of each distributing point in the contour data device as contour data for the overlapping region.

Specifically, the contour data memory includes a provisional contour data memory for storing indefinite contour data, and a recorded contour data memory for storing definite contour data. The contour data stored in the provisional contour data memory are transferred to the recorded contour data memory upon an instruction input by an operator.

According to the present invention, even when a discontinuity occurs with the extracted contour lines in adjacent partial image sections, a correction is effected to connect these extracted contour lines smoothly. This correction is based on the contour data of the overlapping region of the image sections, which data comprise coordinates of the distribution points obtained from the steps (d) through (f) above. Consequently, it is no longer necessary to effect fine adjustment of the threshold level for each partial image section as practiced in the prior art, in order to obtain a continuous extracted contour line running through adjacent image sections. A contour line may be extracted with high precision simply by setting a threshold level for faithful extraction of a contour line of a specified image area in each partial image section.

In addition, the contour data in the overlapping region of adjacent partial image sections are prepared each time a new partial image section is set, extracted contour lines thereby obtained being displayed in real time. This enables the operator to carry out the operation by checking validity of a threshold level set for each partial image section. In this way, the contour line may be extracted with enhanced reliability and efficiency.

BRIEF DESCRIPTION OF THE DRAWINGS

For the purpose of illustrating the invention, there are shown in the drawings several forms which are presently preferred, it being understood, however, that the invention is not limited to the precise arrangements and instrumentalities shown.

FIGS. 1 through 3 illustrate the prior art, in which:

FIG. 1 is an explanatory view of a contour line extracting process using partial image sections, and FIGS. 2 and FIGS. 3A-3C are explanatory views of problems of the prior art.

FIGS. 4 through 16 show an embodiment of the present invention, in which:

FIG. 4 is a block diagram showing an outline of a silhouette mask preparing system using an image contour data preparing method embodying the present invention, FIG. 6 is a flowchart showing a processing sequence for detecting a trace starting point and a tracing direction, FIG. 7 is a flowchart showing a processing sequence for tracing a contour line, FIG. 8 is a flowchart showing a processing sequence for connecting extracted contour lines between adjacent partial image sections, FIG. 9 is an explanatory view of partial image sections appearing on a CRT screen, FIGS. 10 and 11 are explanatory views of the process for detecting a trace starting point, FIG. 15 is an explanatory view of the process for detecting a trace starting point, and FIG. 16 is an explanatory view of the process for connecting extracted contour lines between adjacent partial image sections.

DESCRIPTION OF THE PREFERRED EMBODIMENT

A preferred embodiment of the present invention will be described in detail hereinafter with reference to the drawings.

Figure 1:
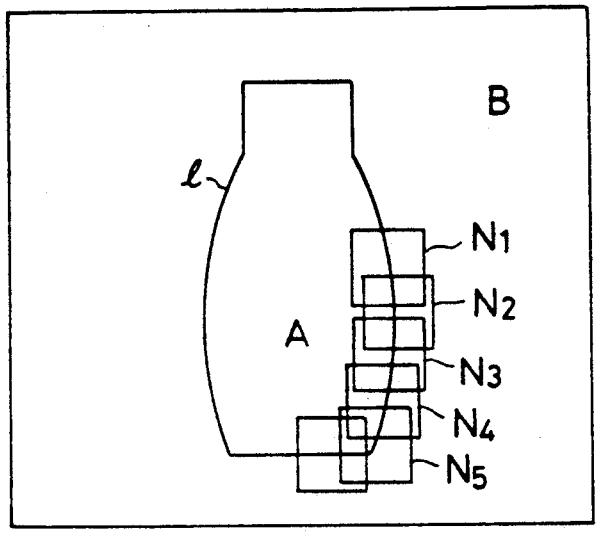
Figure 2:
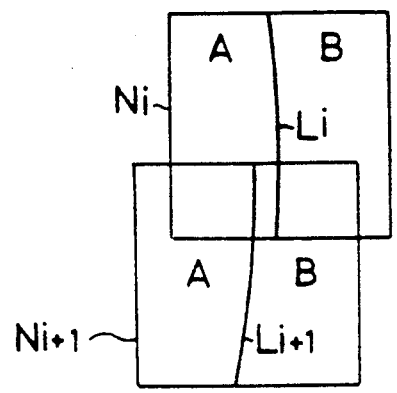
Figure 3A:
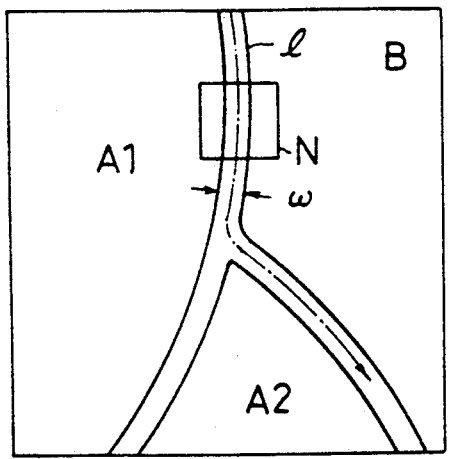
Figure 3B:
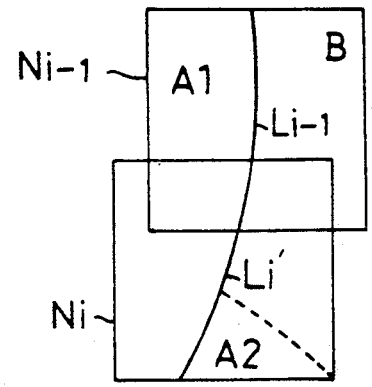
Figure 3C:
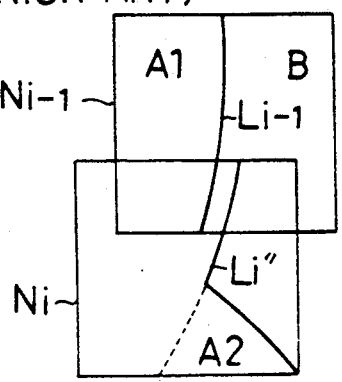
Figure 4:
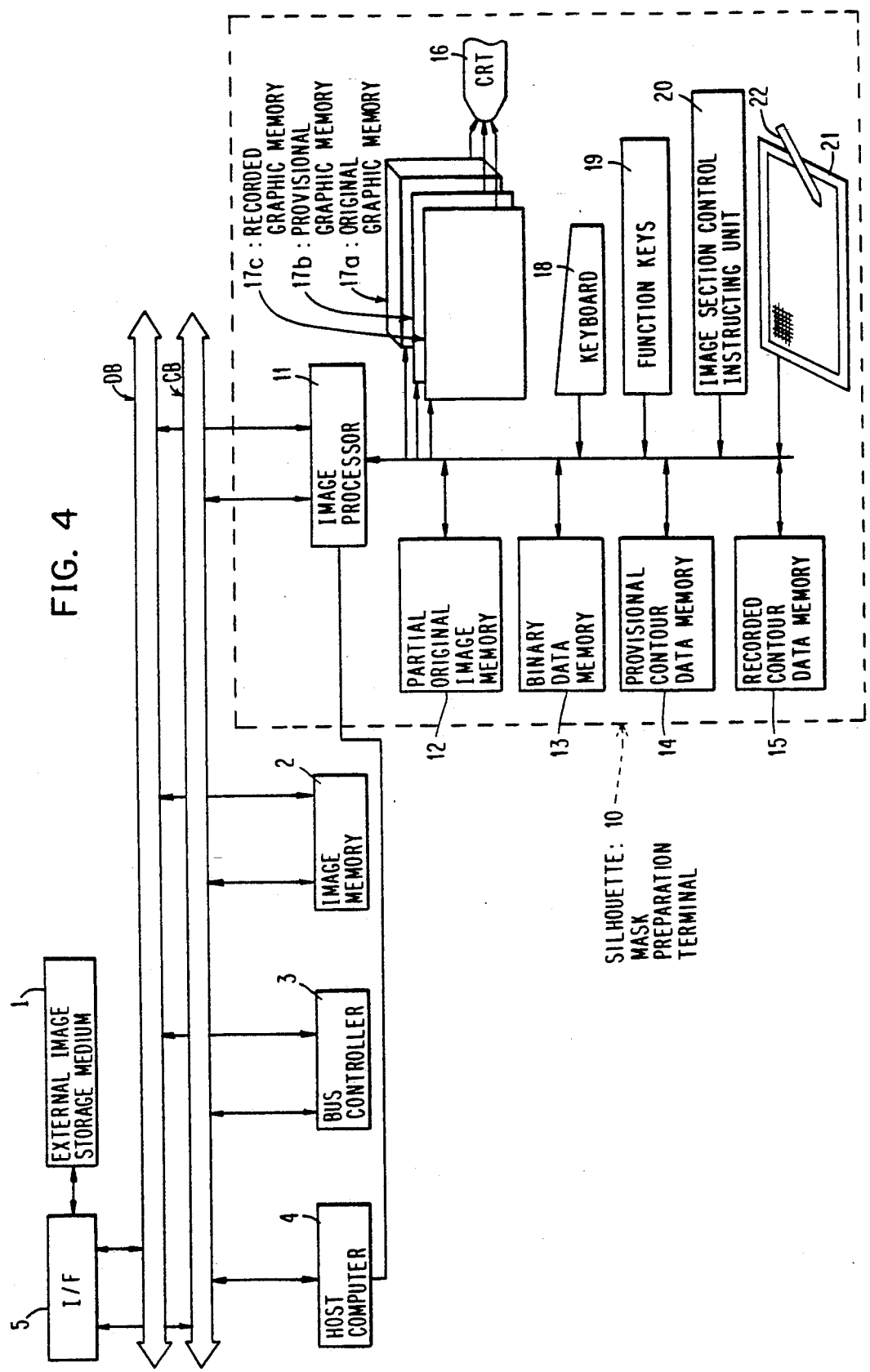

FIG. 4 is a block diagram showing an outline of a silhouette mask preparing system using an image contour data preparing method embodying the present invention.

This system once transfers various original image data from an external image storage medium 1 such as a magnetic tape or an optical disk to an image memory 2. A plurality of silhouette mask preparation terminals 10 each make random access to the image memory 2 to have necessary original image data transferred thereto from the image memory 2. For this purpose, a bus cycle of a data bus DB is divided into minute time slots each for transferring an individual original image data. A bus controller 3 provides such timing controls of the data bus DB. A host computer 4, independently of processing carried out at each terminal 10, reads from the external image storage medium 1 various original image data designated in advance by each terminal 10, and transfers such data to the image memory 2. In FIG. 4, reference 5 denotes an interface for connecting the external image storage medium 1 to this system, and reference CB denotes a control bus.

Each of the silhouette mask preparation terminals 10 includes an image processor 11 for carrying out various types of image processing as described later; a partial original image memory 12 for storing original image data of a designated partial image section (hereinafter referred to as partial original image data); a binary data memory 13 for storing binary data produced by binarizing the partial original image data: a provisional contour data memory 14 for storing indefinite data among extracted contour data; a recorded contour data memory 15 for storing definite data among the extracted contour data; a CRT 16; an original image display memory 17a, a provisional graphic display memory 17b and a recorded graphic display memory 17c each having a bit-map corresponding to a CRT screen; a keyboard 18 for designating an original image to be extracted and inputting other information necessary for preparation of a silhouette mask; function keys 19 for designating an extract mode (a mode according to the method of the present invention or a manual extract mode) and for inputting an end and other instructions; a partial image section control instructing unit 20 for setting a threshold level for binarizing the original image data, and parameters for partial image section sizes; and a digitalizer 21 and a stylus pen 22 for designating positions of partial image sections displayed on the CRT screen.

In this embodiment, the external image storage medium 1 and image memory 2 are shared by the plurality of silhouette mask preparation terminals 10 for high use efficiency of the system. It will be appreciated that the present invention, of course, is not limited to such a system.

The way in which this system operates will be described with reference to the flowcharts shown in FIGS. 5A and 5B.

Figure 9:
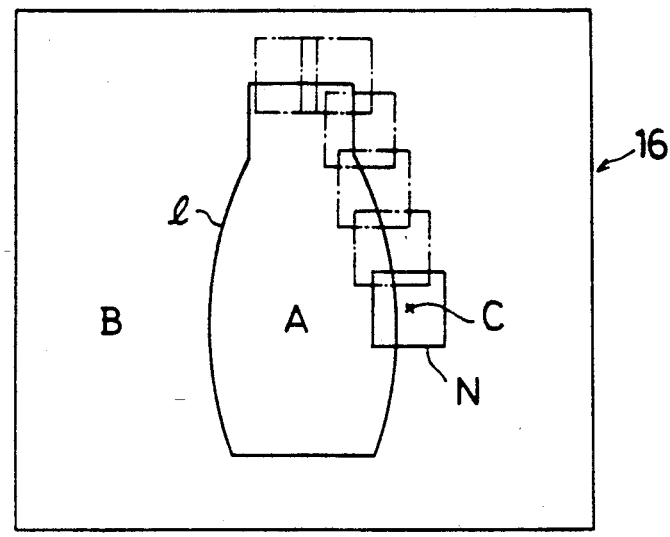

Preparatory to extract processing, necessary original image data are read from the external image storage medium 1 and stored in the image memory 2 under control of the host computer 4. In this example, the image memory 2 stores color image data selected in advance from Y (yellow), M (magenta), C (cyan) and K (black) color image data of an original image, or monochromatic image data such as black and white image data obtained by appropriately synthesizing the color image data. Of course, all the four color data of a required original image may be stored if the memory capacity permits. On the other hand, a terminal 10 designates an original image for preparation of a silhouette mask to the image memory 2. Image data of this original image are transferred to the original image memory 17a, and its image is displayed in various tones on the CRT 16 as shown in FIG. 9. FIG. 9 includes an area A which is a particular image area for extraction, and an area B which is the background.

Figure 5A:
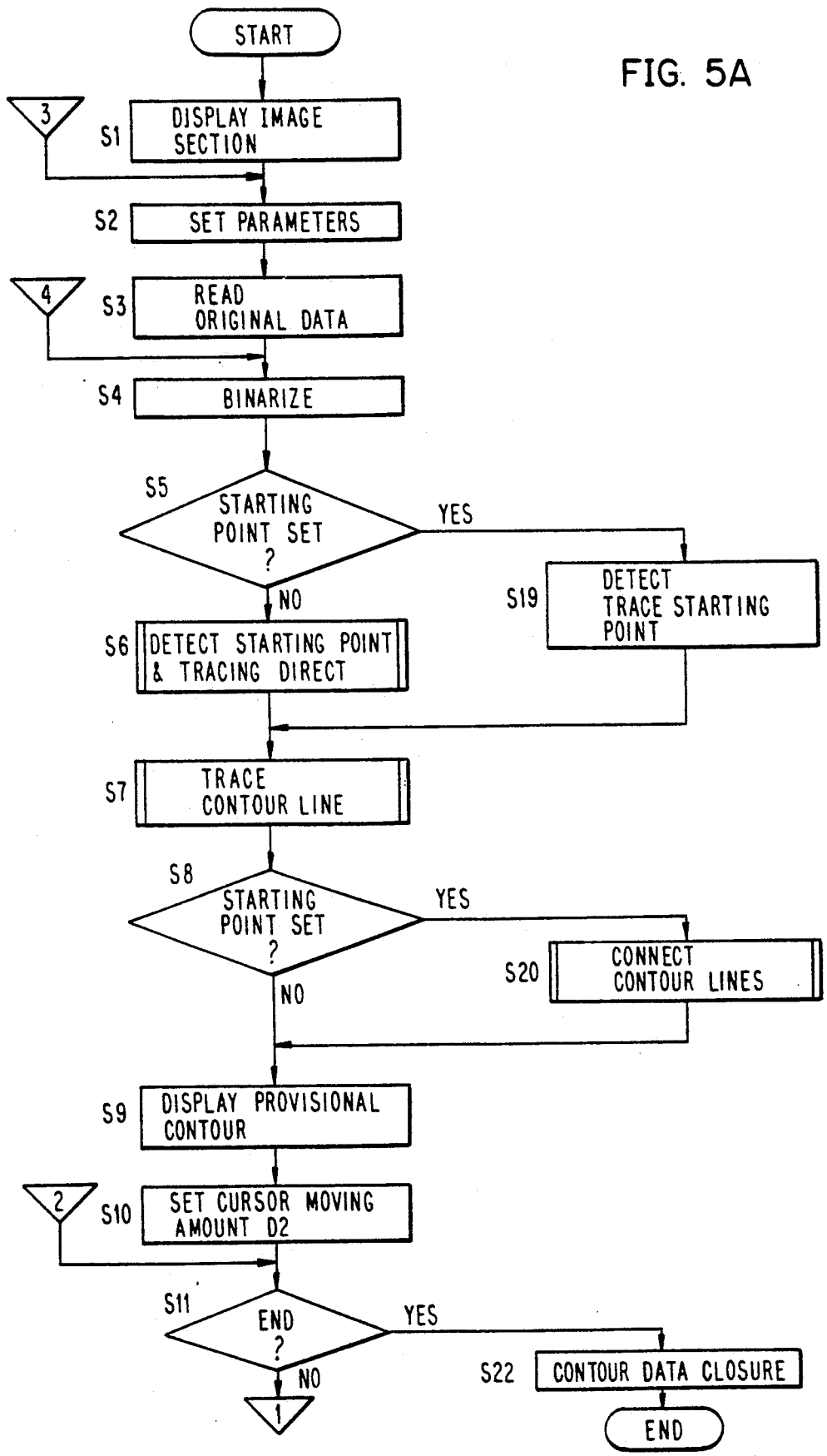
FIGS. 5A and 5B are flowcharts showing a processing sequence of contour data extraction.

When the system is started, the CRT 16 displays a cursor C and, around the cursor C, a rectangular partial image section N of a size set through the partial image section control instructing unit 20, as highlighted and superposed on the original image (steps S1 and S2 in FIG. 5A). The partial image section N defines part of the original image for contour line extraction. The position of the cursor C on the screen corresponds to a coordinate point on the digitalizer 21 contacted by the stylus pen 22. The partial image section N may be set to a selected position on the screen by moving the stylus pen 22. The operator manipulates the stylus pen 22 while watching the CRT screen, to move the partial image section N to a selected position within a range including a contour line 1 of the particular image area A.

When the partial image section N is displayed, partial original image data corresponding to the partial image section N are read, without being thinned out, from the image memory 2 and stored in the partial original image memory 12 (step S3). The image processor 11 binarizes the partial original image data by referring to a threshold level set through the partial image section control instructing unit 20. The resulting binary data are stored in the binary data memory 13 (step S4).

Next, for tracing the contour line 1 of the particular image area A, a trace starting point and which way the contour line should be traced (clockwise or counterclockwise) are detected from the position of the cursor C. The starting point and direction of tracing are set (fixed) on the basis of cursor instructions given by the operator. This operation is carried out in order to obtain data of an extracted contour line as vector data of a line connecting point coordinates such that, usually, the image area lies on the right or left side thereof. Steps S5 through S15 in FIGS. 5A and 5B represent this processing sequence followed when the system is started.

Figure 6:
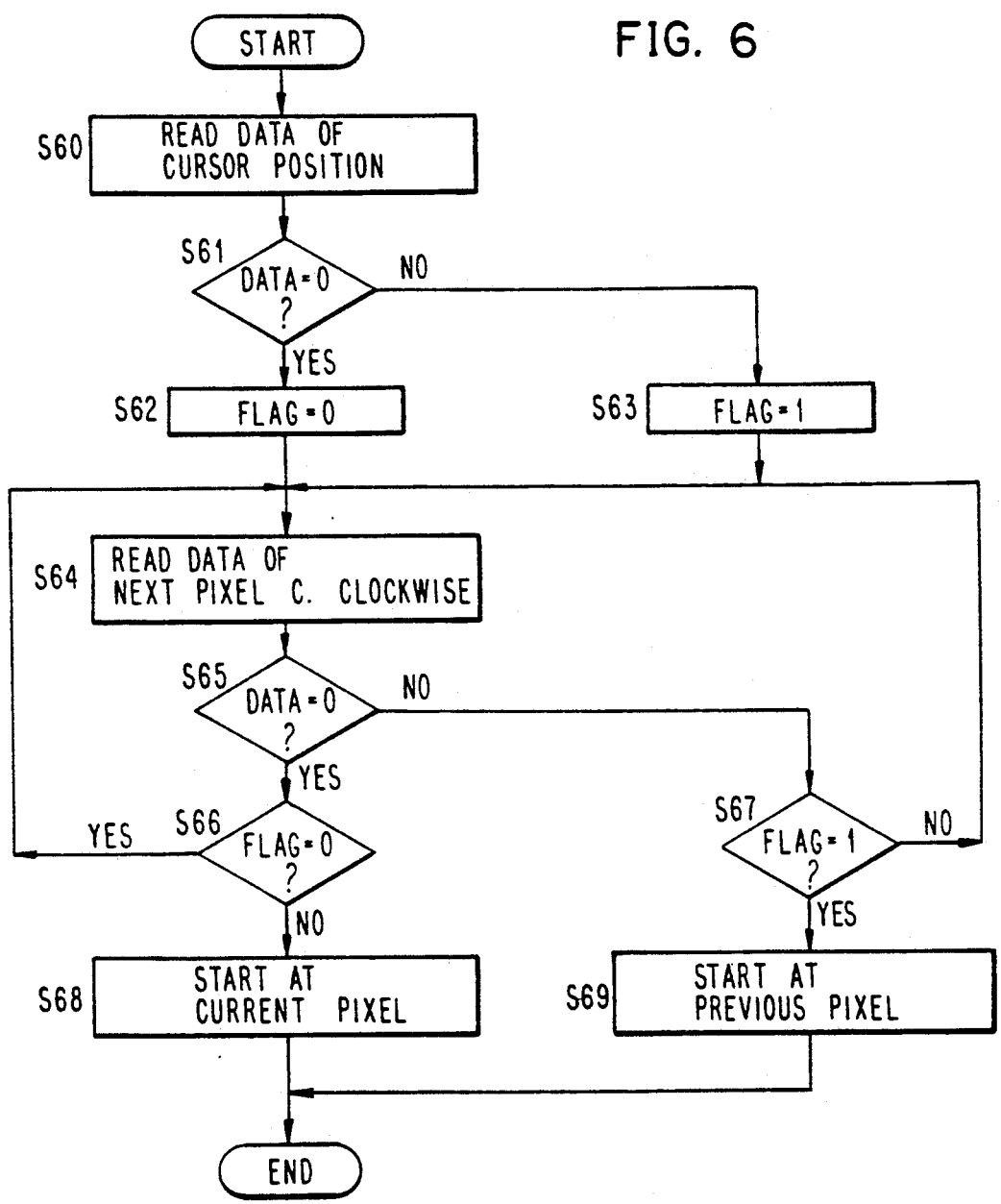

Step S5 is executed to determine whether a trace starting point has been set or not. The operator sets a trace starting point and a tracing direction by pressing down the stylus pen 22 to operate a switch provided at a tip end thereof. In an initial state without a trace starting point set, the program moves from step S5 to step S6 for detecting a trace starting point and a tracing direction from the position of the cursor C. The detecting process carried out at step S6 will be described in detail hereinafter with reference to the flowchart shown in FIG. 6.

A binary data of a pixel corresponding the position of the cursor C is read from the binary data memory 13. Whether this data is "0" or "1" is checked to find out whether the cursor C lies outside or inside the particular image area A. (Steps S60 and S61)

In this embodiment, it is predetermined that the contour line 1 of the particular image area A is traced counterclockwise if the cursor C lies outside the image area A, and clockwise if the cursor C lies inside. As distinct from this, it has been conventional practice to operate a separate switch provided for changing tracing directions. The operator constantly holds a cursor position setting device such as a stylus pen in his or her hand to trace the contour line of a particular image area within a partial image section. In this sense, this embodiment which allows a tracing direction to be set by changing the cursor position realizes an improvement in operating efficiency upon the prior art.

It is assumed here that the binary data of the particular image area A is "1" and that of the background area B "0". If the binary data of the pixel corresponding to the position of the cursor C is "0", a tracing direction indicator flag is set to "0" (step S62). If this data is "1", the indicator flag is set to "1" (step S63). In this way, a tracing direction is detected. Then, the starting point detection is carried out at steps S64 through S69.

Figure 10:
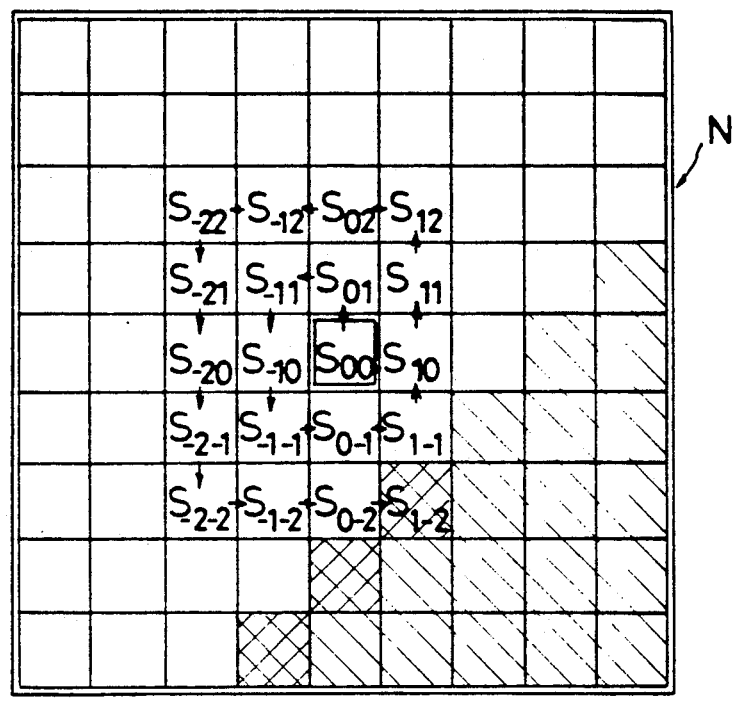
Figure 11:
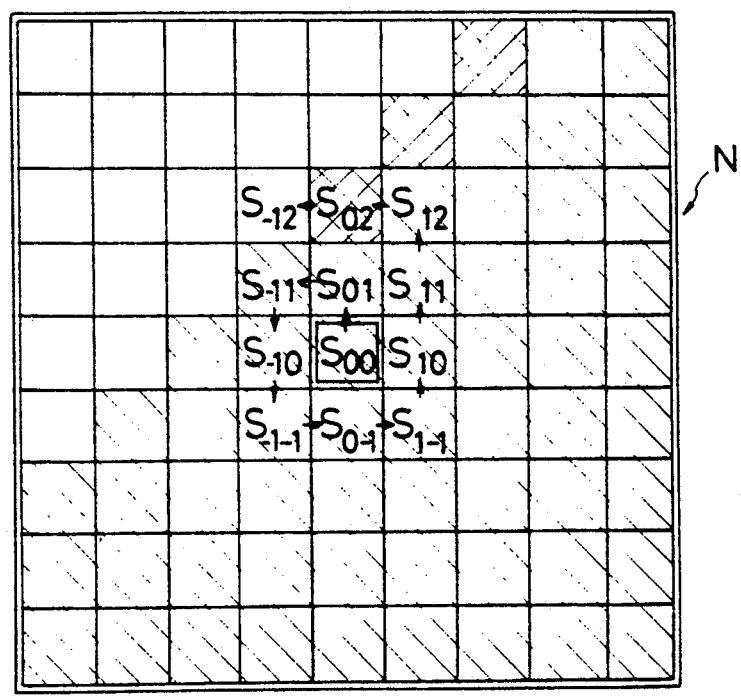

As shown in FIG. 10 or 11, a trace starting point is detected at steps S64 through S69 by reading binary data of adjacent pixels successively in a fixed direction (counterclockwise in this example) and in a spiral form around the pixel corresponding to the position of the cursor C. FIG. 10 shows a data reading order followed when a position S00 to which the cursor C is set lies outside the particular image area A. FIG. 11 shows a data reading order followed when the position S00 lies inside the image area A. In these drawings, the hatched regions are where the binary data are "1" indicative of the image area A, while the white regions are where the binary data are "0" indicative of the background area B.

In the case shown in FIG. 10, adjacent pixels are read successively counterclockwise and, when the binary data changes from "0" to "1" (from S0-2 to S1-2), the current pixel position (S1-2) is set as a trace starting point. In the case shown in FIG. 11, adjacent pixels are read successively counterclockwise and, when the binary data change from "1" to "0" (from S02 to S-12), the previous pixel position (S02) is set as a trace starting point.

When a trace starting point and a tracing direction have been detected as above, the program returns to step S7 in FIG. 5A.

At step S7, the contour line within the partial image section N is traced by what is known as the 8 connectivity method. Details of the contour line tracing process will be described hereinafter with reference to the flowchart shown in FIG. 7.

First, the starting point obtained from the trace starting point detecting process is set as a center point for the search process based on the 8 connectivity method (step S70). If the tracing direction indicator flag is set to "0" at step S6, adjacent pixels are extracted successively counterclockwise around the center point (steps S71 and S72). If the indicator flag is set to "1", adjacent pixels are extracted clockwise (steps S71 and S73).

Figure 12A:
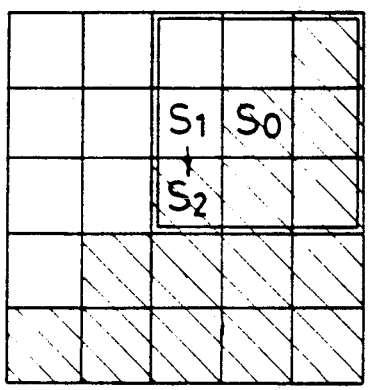
FIGS. 12A-B and 13A-B are explanatory views of the process for tracing a contour line.
Figure 12B:
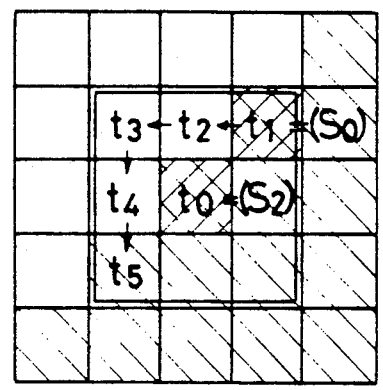

FIGS. 12A and 12B show a sequence of tracing the contour line followed when the tracing direction indicator flag is set to "0", i.e. the initial cursor position is set outside the particular image area A. The double frame in FIG. 12A shows a first group of eight linked pixels. Pixel S0 (which corresponds to the pixel S1-2 in FIG. 10) forms the center point, and pixel S1 is a pixel at which search is started. The latter is the last pixel that showed "0" binary data during the trace staring point detection (which corresponds to the pixel S0-2 in FIG. 10). Pixel S2 is a contour pixel detected by the 8 connectivity method. When this pixel S2 is detected, the program moves to a next stage of detection. The double frame in FIG. 12B shows a group of eight linked pixels for the next contour tracing stage. Pixel t0 forms a new center point, which is the contour pixel S2 detected previously. Pixel t1 forms a new search staring point, which is the previous center point S0. Pixel t5 is a contour pixel detected through the current search and forming a center point of the next group of eight pixels. Such search is repeated thereafter to trace the contour line within the partial image section N counterclockwise.

Figure 13A:
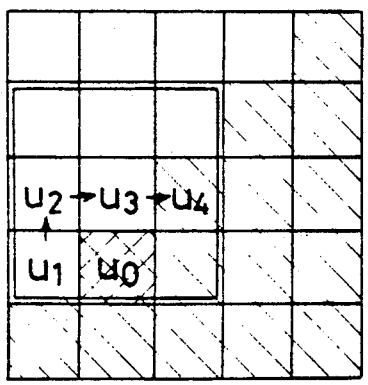
Figure 13B:
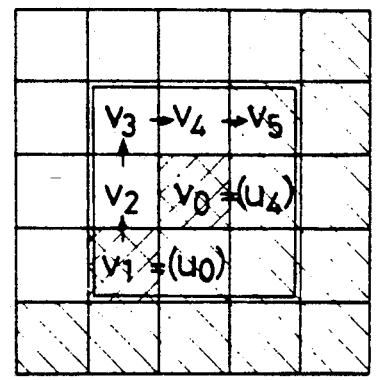

FIGS. 13A and 13B show a sequence of tracing the contour line followed when the tracing direction indicator flag is set to "1", i.e. the initial cursor position is set inside the particular image area A. FIG. 13A shows a first group of eight pixels. Pixel u0 forms the center point, pixel u1 forms a search starting point, and pixel u4 is a contour pixel detected. FIG. 13B shows a stage following the stage shown in FIG. 13A. Pixel v0 forms a center point, which is the contour pixel u4 detected previously. Pixel v1 corresponds to the previous center point u0. Pixel v5 is a contour pixel detected through the current search and forming a center point of the next group of eight pixels. This search is repeated thereafter to trace the contour line within the partial image section N clockwise.

Figure 7:
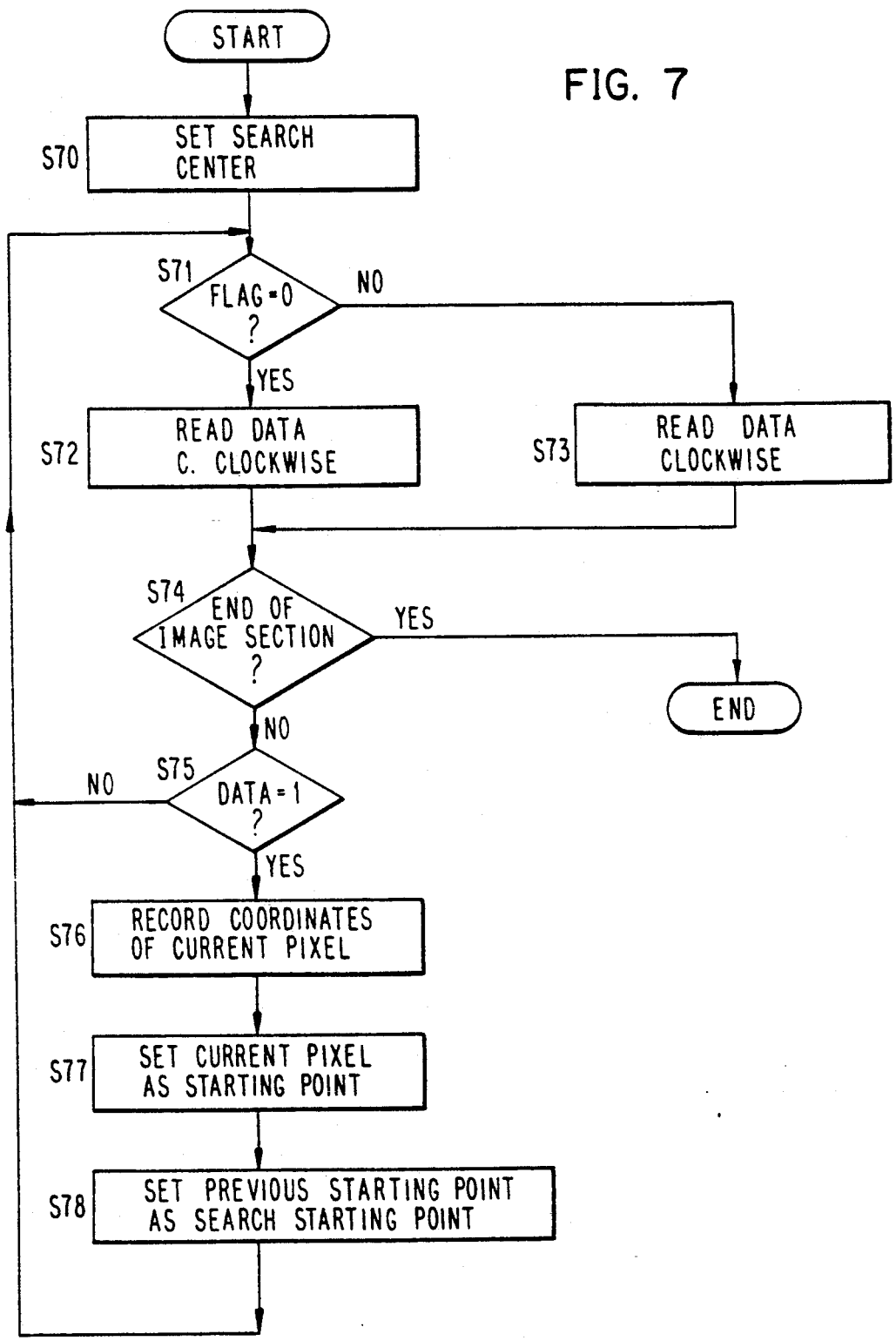

Steps S72 through S78 in FIG. 7 represent the tracing sequence described above, at which coordinates of the detected contour pixels are recorded successively. The contour line within the partial image section N is traced clockwise or counterclockwise and, when a searched pixel forms an end of the image section N, the tracing process for this image section N is completed (step S74).

Reverting to FIG. 5A, after step S7 is executed for tracing the contour line within the partial image section N, the contour data obtained in a vector data form having plural coordinates are stored in the provisional contour data memory 14 shown in FIG. 4. A row of pixels is presented in the provisional graphic display memory 17b, and a provisional extracted contour line is displayed on the CRT 16 as highlighted by varying its color or brightness (step S9).

Figure 14A:
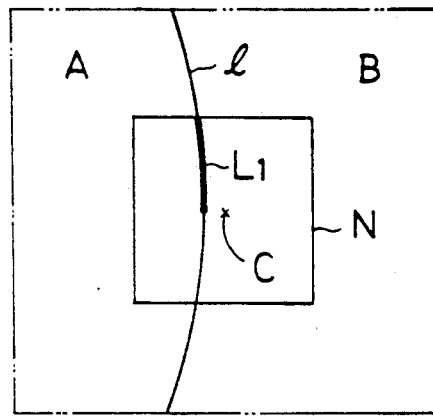
FIGS. 14A and 14B are explanatory view showing a mode of displaying tracing directions.
Figure 14B:
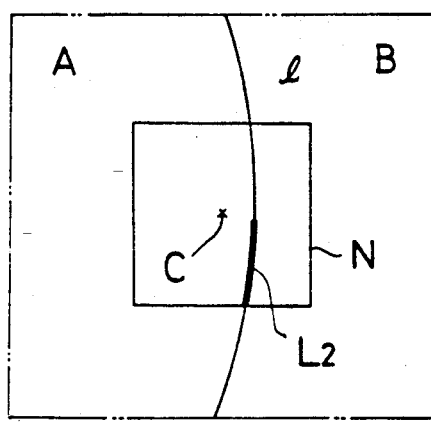

FIGS. 14A and 14B show provisional extracted contour lines highlighted within a partial image section N on the CRT screen when the contour line tracing process is completed. FIG. 14A shows a provisional extracted contour line L1 displayed when the cursor C is outside the particular image area A, with the tracing direction shown to extend upward. FIG. 14B shows a provisional extracted contour line L2 displayed when the cursor C is inside the particular image area A, with the tracing direction shown to extend downward. The operator can perceive the tracing direction from the provisional extracted contour line displayed in highlight. If the operator wishes to trace the contour line in a direction opposite to the displayed tracing direction, he or she may move the cursor C to the opposite area. In this way, a desired tracing direction may be selected at will.

The provisional contour data stored in the provisional contour data memory 14 and the provisional extracted contour line based on this data and displayed through the provisional graphic display memory 17b are indefinite data and line freely replaceable by changing the tracing direction as described above or by varying the threshold level. As distinct from this, recorded contour data stored in the recorded contour data memory 15 shown in FIG. 4, and a recorded, extracted contour line based on this data and displayed through the recorded graphic display memory 17c are of definite nature invariable by a change in the threshold level or other factors.

Figure 5B:
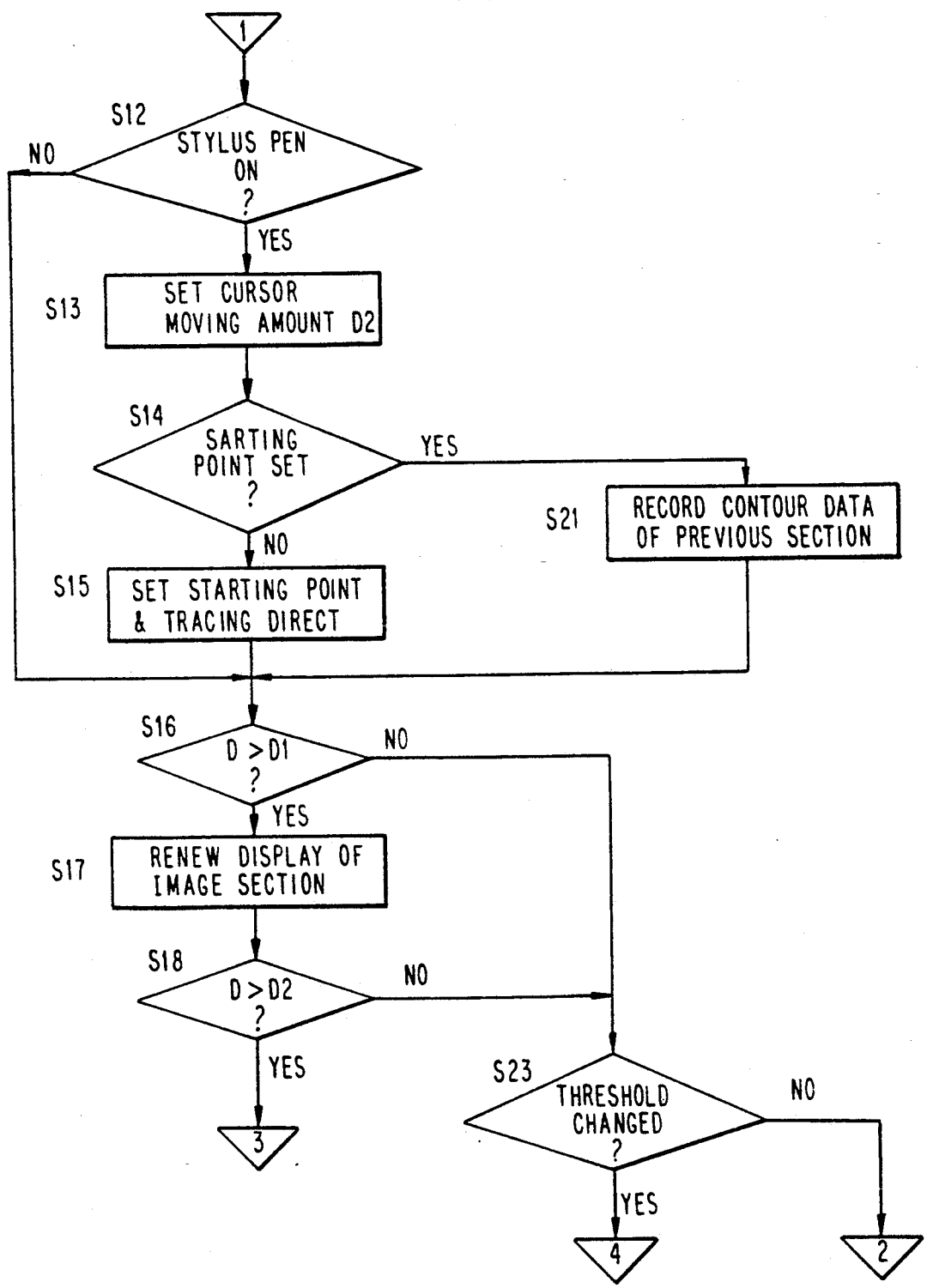

After a provisional extracted contour line is displayed at step S9, the program moves through steps S10 and S11 to step S12 in FIG. 5B for checking if the switch of the stylus pen 22 is turned on. If the stylus pen 22 is on, the program moves through steps S13 and S14 to step S15 for setting (fixing) a trace starting point and a tracing direction.

When a trace starting point and a tracing direction have been set as above, the operator moves the stylus pen 22 on the digitalizer 21 to shift the partial image section N, as shown in dot-and-dash lines in FIG. 9, in the tracing direction along the contour line 1 of the particular image area A on the CRT screen. It is unnecessary to cause the cursor C to move accurately on the contour line 1 since the trace starting point is automatically detected at step S19 as described later, for enabling tracing of the contour line 1 only if the partial image section N includes part of the contour line 1.

When an amount of movement D of the cursor C exceeds an amount D1 predetermined for detecting cursor movement (step S16), the display position of the partial image section N is renewed according to the amount of movement D (step S17). If the amount of movement D of the cursor C exceeds an amount D2 (which is greater than D1) set at step S10 or S13 (step S18), the program returns to step S3 to read from the image memory 2 original image data corresponding to the area covered by the current partial image section N, which is followed by the described binarizing process (step S4).

In this embodiment, as described above, two values are set at steps S10 and S13 as the amount of movement D2 of the cursor C. The amount D2 has a value set at step S10 for movement made with the stylus pen 22 not pressed down (i.e. the switch is off). This is a relatively small amount of movement so that positional instability of the stylus 22 held by the operator will not result in reading from the image memory 2 of the original image data of the partial image section N. The amount D2 set at step S13 is for movement made with the stylus pen 22 pressed down (i.e. the switch is on). This amount is intended for providing a timing for reading partial image data from the image memory 2, which will be described later.

Figure 15:
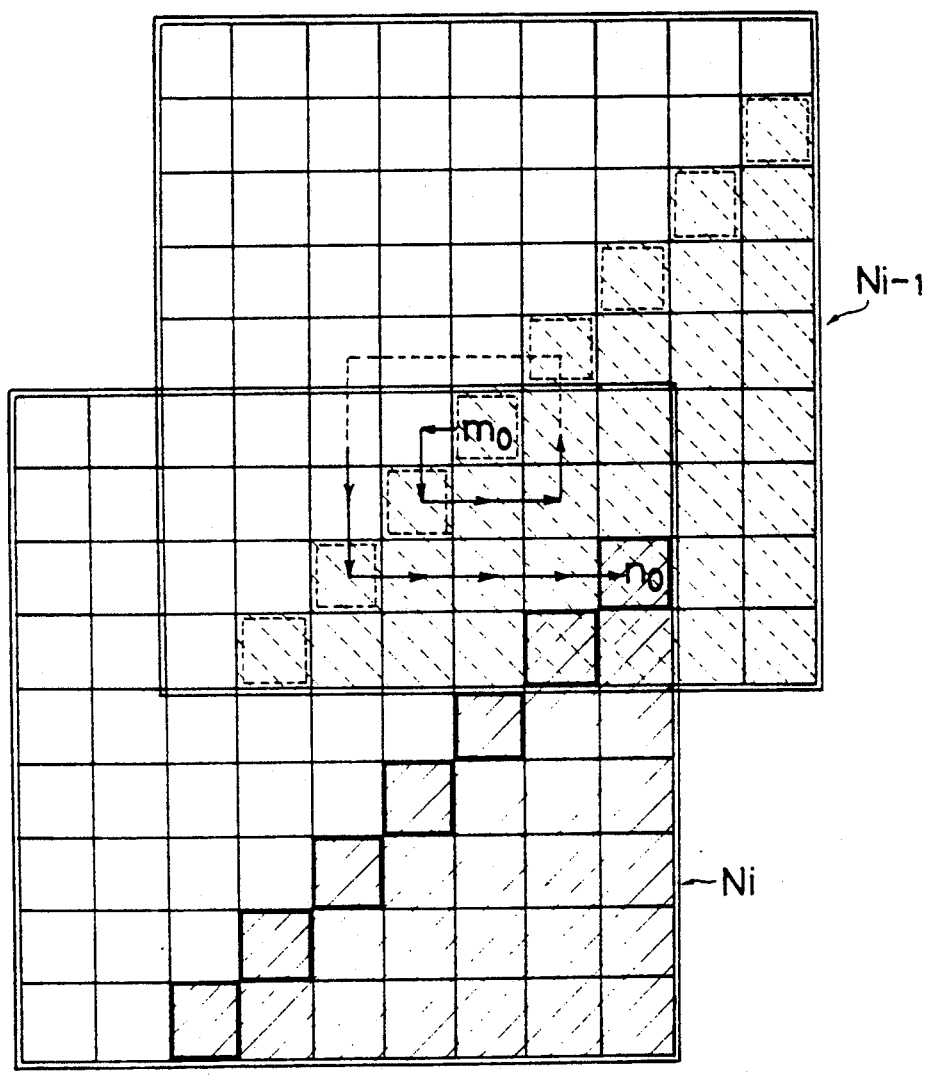

After executing step S5 a second time and onward, the program moves to step S19 since a trace starting point has already been set. At step S19, a starting point is detected for tracing the contour line within a new partial image section. Reference will be made to FIG. 15 next.

In FIG. 15, reference Ni denotes a current partial image section newly set, and reference Ni−1 a partial image section set previously. In this embodiment, a threshold level may be set for each partial image section in order to extract the contour line faithfully. Consequently, as shown in FIG. 15, a difference in threshold level could result in a displacement between a binary image (the portion hatched in broken lines) in the previous partial image section Ni−1 and a binary image (the portion hatched in solid lines) in the current partial image section Ni. To cope with this situation, adjacent pixels are searched counterclockwise, for example, as in detecting a trace starting point as already described, around the pixel (referenced m0 in FIG. 15) which is the first intersecting point between the contour data (the pixels enclosed in broken lines) of the previous partial image section Ni−1 and the frame of the current partial image section Ni. The pixel (referenced n0) at which the binary data changes from "1" to "0" or "0" to "1" is detected, and this pixel n0 is set as a starting point for tracing the contour line.

Figure 8:
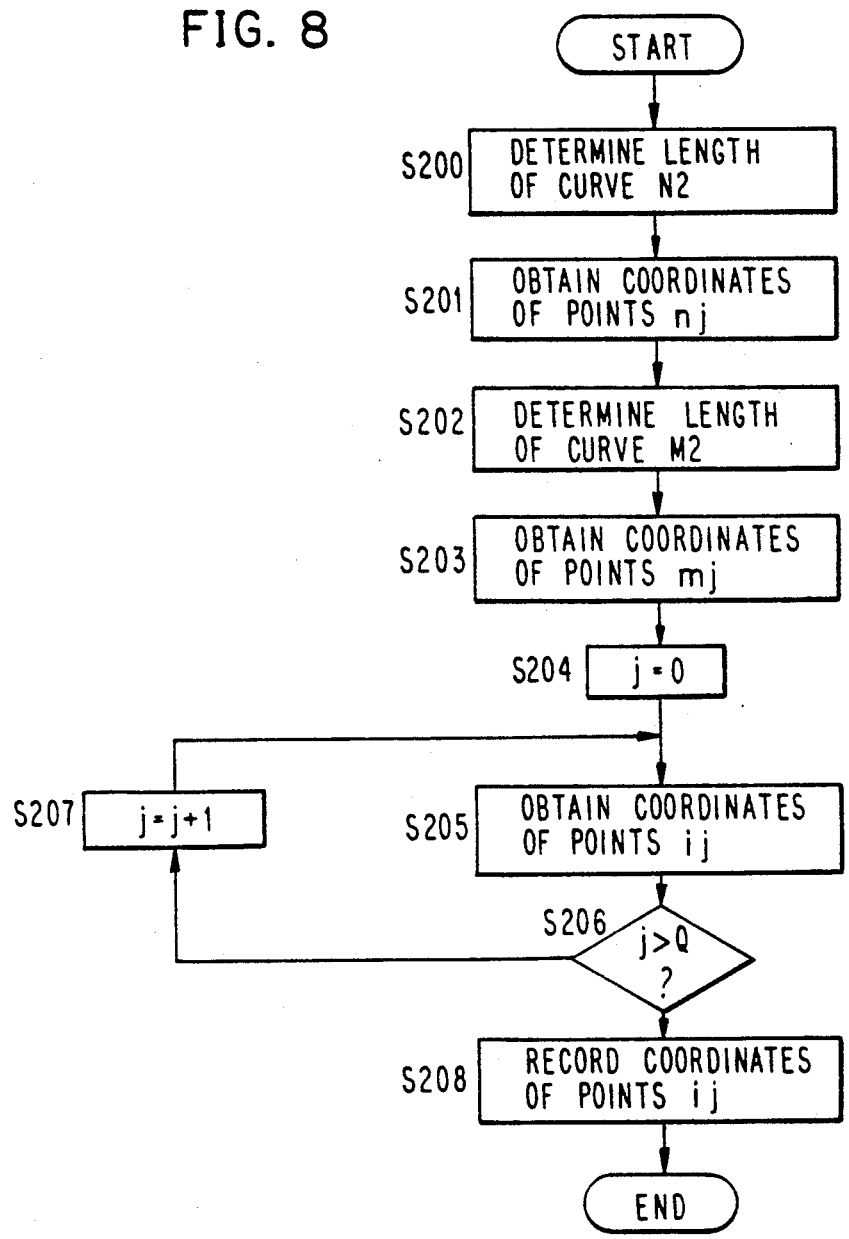

Once a starting point for tracing the contour line is determined as above, the program moves to step S7 for carrying out the described contour line tracing process for the current partial image section Ni. The pixels in the partial image section Ni enclosed in thick solid lines in FIG. 15 are contour pixels detected. As already noted, FIG. 15 shows a case where the adjacent partial image sections Ni−1 and Ni have discontinuous extracted contour lines. After the contour line in the current partial image section Ni is extracted, the program moves through step S8 to step S20 for smoothly connecting the extracted contour lines in the adjacent partial image sections. This process will be described next with reference to the flowchart shown in FIG. 8 and to FIG. 16.

Figure 16:
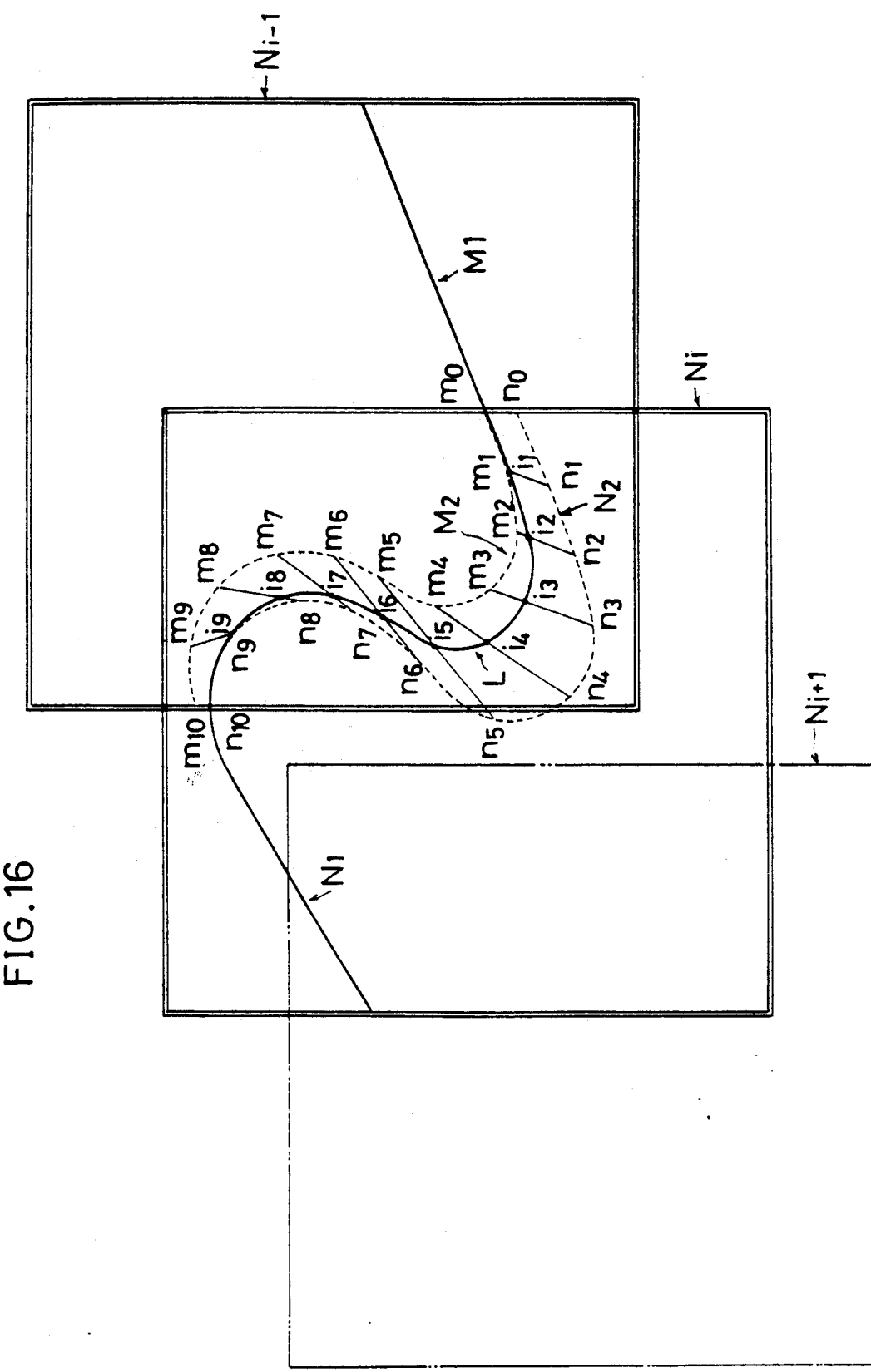

In FIG. 16, curves M1 and M2 represent an indefinite contour line extracted from the previous partial image section Ni−1, while curves N1 and N2 represent an indefinite contour line extracted from the current partial image section Ni. The partial extracted contour lines M1 and N1 may be displayed on the CRT screen through the provisional graphic memory 17b as highlighted and superposed on the original image. However, the partial extracted contour lines M2 and N2 shown in broken lines in the overlapping region of the partial image sections Ni and Ni−1 cannot be displayed as they are because of a displacement therebetween.

Reference n0 in FIG. 16 denotes the starting point in the current partial image section Ni detected at step S19 in FIG. 5A (which corresponds to the pixel n0 in FIG. 15). Next, based on the contour data of the current partial image section Ni, the length LN to the exit from the overlapping region of the partial image sections Ni and Ni−1 (i.e. the length of the curve N2) is determined by counting the number of pixels, for example (step S200 in FIG. 8). The length LN of the curve N2 thus obtained is divided into equal parts the number of which is Q, and coordinates (njx, njy) of dividing points in a row are obtained (step S201). In the example shown in FIG. 16, the curve N2 is divided into 10 equal parts.

Reference m0 in FIG. 16 denotes the first point at which the contour data of the previous partial image section Ni−1 crosses the current partial image section Ni as detected at step S19 in FIG. 5A (which corresponds to the pixel m0 in FIG. 15). Then, as at step S200, the length LM of the curve M2 is obtained (step S202). As is the length LN of the curve L2, the length LM of the curve M2 is divided into equal parts the number of which is Q, and coordinates (mjx, mjy) of dividing points in a row are obtained (step S203). Then, coordinates (ijx, ijy) of distribution points ij proportionally distributing, in the ratio of j:(Q-j), straight lines extending between the respective dividing points nj and mj are obtained successively from j=0 (steps S204 to S207). The coordinates (ijx, ijy) are expressed by the following equations:

$$ijx = \{j \cdot njx + (Q-j)mjx\}/Q$$

$$ijy = \{j \cdot njy + (Q-j)mjy\}/Q$$

The coordinates of the proportional distribution points ij obtained as above are recorded in the provisional contour data memory 14 as indefinite contour data for the overlapping region of the partial image sections Ni−1 and Ni (step S208).

The contour data of the overlapping region recorded in the provisional contour data memory 14 are displayed in highlight on the CRT screen as the provisional extracted contour line (the curve L shown in a solid line within the overlapping region in FIG. 16) at step S9 in FIG. 5A, along with the provisional extracted contour lines outside the overlapping region of the two partial image sections. The operator appropriately adjusts the threshold level for the current partial image section Ni while watching the CRT screen, to obtain an optimal extracted contour line as the contour line of the particular image area A. Step S23 in FIG. 5B checks the threshold level. Whenever the threshold level is adjusted, the program returns to step S4 in FIG. 5A for a binarizing process. Thereafter, the described processes are carried out to extract contour data from the partial image section Ni and to connect the contour lines in the region overlapping the previous partial image section. The contour data in the provisional data memory 14 are renewed, thereby varying the provisional extracted contour line on the CRT screen.

As described above, the operator is able to observe, in real time, the contour line smoothly interconnecting the extracted contour lines in the overlapping region between the partial image sections. The image extracting operation may progress as the operator determines every now and then whether the threshold level as set is appropriate or not. Thus, the contour line may be extracted with increased reliability and efficiency.

When the operator judges that a proper extracted contour line has been obtained and, in the condition shown in FIG. 16, turns on the stylus pen 22, the program moves from step S12 in FIG. 5B through steps S13 and S14 to step S21. At step S21, of the provisional contour data of the previous partial image section Ni−1, those of the region outside the overlapping region (i.e. contour data corresponding to the curve M1 in FIG. 16) are stored in the recorded contour data memory 15 as definite contour data. These recorded contour data are displayed in highlight as a recorded, extracted contour line on the CRT screen through the recorded graphic display memory 17c. The provisional contour data formed in the overlapping region of the partial image sections Ni−1 and Ni are stored in the recorded data memory 15 by turning on the stylus pen 22 after moving the current partial image section Ni and setting a next partial image section Ni+1 separated from the overlapping region of the image sections Ni and Ni−1.

The above operation is carried out to set the new partial image section by moving the stylus pen 22 with the switch thereof turned off (that is, with the stylus pen 22 lightly touching the digitalizer 21). Thereafter, the operator turns on the stylus pen 22 to store the provisional contour data of the previous partial image section outside the overlapping region as recorded contour data. According to this embodiment, it is also possible to trace the contour line with the switch of the stylus pen 22 turned on (that is, with the stylus pen 22 pressed on the digitalizer 21). In this case, the provisional contour data of the previous partial image section outside the overlapping region are stored in the recorded contour data memory 15 as continuous, definite contour data.

Referring to steps S16 and S17 in FIG. 5B, when the cursor C moves in excess of the predetermined amount D1, the partial image section displayed is renewed successively, with the partial original image data corresponding to the respective partial image sections read from the image memory 2 at step S3. The partial original image data are read from the image memory 2 in a necessary quantity corresponding to the partial image sections when the stylus pen 22 is off and step S18 finds the amount of cursor movement D greater than the relatively small amount D2 set at step S10, or when the stylus pen 22 is on and the amount of cursor movement D greater than the relatively small amount D2 set at step S13 (e.g. half the length of a side of the partial image section).

After tracing a complete cycle along the contour line of the particular image area A displayed on the CRT screen, the operator gives an end instruction through one of the function keys 19. Then, the program moves from step S11 to step S22 for connecting the end point of the current partial image section N and the trace starting point to close a series of contour lines extracted. These contour data are stored in the recorded contour data memory 15.

Once the data of the closed, extracted contour line of the particular image area A are obtained, the silhouette mask is filled out by setting the pixels lying inside or outside the extracted contour line to a data value, such as "1" or "0", distinctive from the pixels in the other area.

In the described embodiment, the provisional contour data are connected in the overlapping region of adjacent partial image sections by dividing each of the partial extracted contour lines (the curves M2 and N2 in FIG. 16) in the respective image sections into equal parts. However, it is not absolutely necessary for the dividing points to be arranged equidistantly along each partial extracted contour line, but the extracted contour lines may be divided in corresponding proportions relative to each other. For example, these contour lines may be divided into long parts where they are close to straight lines, and into short parts along positions of large curvature.

If there are no pixel position data corresponding to certain calculated dividing points on the provisional contour data M2 and N2 in FIG. 16, accurate dividing points mj and nj may be obtained by preparing corresponding data through suitable data interpolation.

The present invention may be embodied in other specific forms without departing from the spirit or essential attributes thereof and, accordingly, reference should be made to the appended claims, rather than to the foregoing specification, as indicating the scope of the invention.

What is claimed is:

1. A method of extracting contour data of a particular image area in an original image, comprising the steps of:
   (a) setting a plurality of partial image sections including part of a contour line of said particular image area in the original image, said partial image sections being set successively in a way to partly overlap each other along said contour line;
   (b) binarizing an image in each of said partial image sections by comparing density of each pixel in each of said partial image sections with a selected threshold level;
   (c) preparing contour data of each of said partial image sections by detecting a boundary of the binary image, said contour data representing partial extracted contour lines in said partial image sections;
   (d) obtaining a plurality of corresponding dividing points of two partial extracted contour lines lying in an overlapping region of adjacent partial image sections by dividing said two partial extracted contour lines into corresponding portions;
   (e) distributing line segments linking said corresponding dividing points on said two partial extracted contour lines between a distributing point in ratios corresponding to an order in which said corresponding dividing points are arranged; and
   (f) deriving contour data for said overlapping region from coordinates of each said distributing point.

2. A method as defined in claim 1, wherein the step (c) includes the steps of:
   detecting a tracing direction for tracing said contour line;
   detecting a starting point for tracing said contour line; and
   obtaining the contour data of each of said partial image sections by tracing said contour line in said tracing direction from said starting point.

3. A method as defined in claim 2, wherein said tracing direction is detected by reference to a cursor lying in one of inside and outside positions with respect to each of said partial image sections, said cursor appearing on a display screen for indicating a position of each of said partial image sections.

4. A method as defined in claim 3, wherein the step of detecting said tracing direction includes the steps of:

reading a binary data of a pixel corresponding to the position to which the cursor is set; and detecting said tracing direction by determining whether said binary data is "0" or "1".

5. A method as defined in claim 4, wherein the step of detecting said starting point includes the steps of:

reading binary data of adjacent pixels in a fixed direction in a spiral form around said pixel corresponding to the position to which the cursor is set; and selecting a current data-read pixel or a previous data-read pixel to be said starting point depending on said tracing direction when a variation of said binary data takes place.

6. A method as defined in claim 5, wherein the step of obtaining the contour data of each of said partial image sections by tracing said contour line in said tracing direction from said starting point includes the steps of:

reading the binary data of adjacent pixels successively clockwise or counterclockwise depending on said tracing direction, with said starting point acting as a center of contour data search, from a search starting point provided by a pixel before a pixel at which said variation of said binary data has taken place;

recording, as contour data, coordinates of said pixel at which said variation of said binary data has taken place, said pixel being regarded as a contour pixel; and detecting a new contour pixel by reading the binary data of adjacent pixels successively clockwise or counterclockwise depending on said tracing direction, with said contour pixel acting as a center of next contour data search, from a search starting point provided by said pixel previously acting as the center of search.

7. A method as defined in claim 6, wherein the adjacent pixels read in the search are eight linked pixels.

8. A method as defined in claim 6, wherein the extracted contour lines are displayed in highlight on said display screen.

9. A method as defined in claim 1, wherein the step (d) includes the steps of:

obtaining length of a first extracted contour line from a starting point in a current partial image section to an exit of said overlapping region of adjacent partial image sections by counting pixels;

obtaining coordinates of a first row of dividing points dividing said first extracted contour line into equal length parts;

obtaining length of a second extracted contour line from a first point where contour data of a previous partial image section cross the current partial image section to the exit of said overlapping region of adjacent partial image sections by counting pixels; and obtaining coordinates of a second row of dividing points dividing said second extracted contour line into equal length parts correspondingly to said first extracted contour line.

10. A method as defined in claim 9, wherein said line segments linking the first row of dividing points (nj) and the second row of dividing points (mj) are proportionally distributed between each said distributing point and said corresponding dividing points of said first and second rows of dividing points in a ratio of j:(Q−j) where Q is the number of divisions of each of said extracted contour lines and j is a natural number from 0 to Q.

11. A method as defined in claim 1, further comprising the step of:

(g) carrying out a process, as at steps (d) through (f), of preparing the contour data in the overlapping region of adjacent partial image sections each time a new partial image section is set, to successively display extracted contour lines based on contour data thereby obtained.

12. A method as defined in claim 11, wherein the step (g) includes the step of:

selecting adjacent pixels in a predetermined direction around a pixel forming a first crossing point between contour data of a previous partial image section and a frame of a current partial image section, detecting a pixel at which binary data thereof show a change, and setting said pixel as a starting point for tracing the contour line in said current partial image section.

13. An apparatus for extracting contour data of a particular image area in an original image, comprising:

(a) original image data memory means for storing image data of said original image;

(b) display means for reading and displaying contents of said original image memory means;

(c) partial image section setting means for setting partial image sections including part of a contour line of said particular image area in the original image shown by said display means, said partial image sections being set successively in a way to partly overlap each other along said contour line;

(d) partial original image data memory means for storing original image data in said partial image sections read from said original image data memory means;

(e) binarizing means for binarizing an image in each of said partial image sections by comparing density of each pixel stored in said partial original image data memory means with a selected threshold level;

(f) binary data memory means for storing binary data of said partial image sections;

(g) contour data extracting means for extracting contour data of each of said partial image sections by reading contents of said binary data memory means and detecting a boundary of the binary image;

(h) contour data memory means for storing the extracted contour data;

(i) dividing point calculating means for obtaining a plurality of corresponding dividing points of two partial extracted contour lines lying in an overlapping region of adjacent partial image sections by dividing said two partial extracted contour lines into corresponding portions;

(j) distributing means for distributing line segments, linking said corresponding dividing points on said two partial extracted contour lines, between a distributing point in ratios corresponding to an order in which said corresponding dividing points are arranged; and (k) means for recording coordinates of each said distributing point in said contour data memory means as contour data for said overlapping region.

14. An apparatus as defined in claim 13, wherein said partial image section setting means includes a digitalizer and a stylus pen for setting a center position in each of said partial image sections.

15. An apparatus as defined in claim 13, wherein said contour data memory means includes provisional contour data memory means for storing indefinite contour data, and recorded contour data memory means for storing definite contour data.

16. An apparatus as defined in claim 15, wherein the contour data stored in said provisional contour data memory means are transferred to said recorded contour data memory means upon an instruction input by an operator.

* * * * *